United States Patent [19]

Knauss

[11] Patent Number: 4,485,449

[45] Date of Patent: Nov. 27, 1984

[54] METHOD AND APPARATUS FOR THE DIRECT MEASUREMENT OF THERMAL ENERGY TRANSFERRED BY A FLUID MEDIUM

[75] Inventor: Uwe Knauss, Feldkirchen, Fed. Rep. of Germany

[73] Assignee: Cazzaniga S.p.A., Milan, Italy

[21] Appl. No.: 344,542

[22] Filed: Feb. 1, 1982

[30] Foreign Application Priority Data

Sep. 23, 1981 [IT] Italy .............................. 24091 A/81

[51] Int. Cl.³ .......................... G01K 17/06; G01F 1/86
[52] U.S. Cl. .................................. 364/510; 165/11 R; 364/577; 374/39; 374/41
[58] Field of Search ................... 364/557, 510; 374/39, 374/41, 103, 114, 165, 170, 183, 184, 185; 165/11 R

[56] References Cited

U.S. PATENT DOCUMENTS

| | | | |
|---|---|---|---|
| 3,617,713 | 11/1972 | Karlsson | 377/25 |
| 3,639,737 | 1/1972 | McKee | 364/510 |
| 3,700,865 | 10/1972 | Ley | 364/510 |
| 3,854,038 | 12/1974 | McKinley | 364/510 |
| 4,048,852 | 9/1977 | Sakakibara | 374/41 |
| 4,221,260 | 9/1980 | Otala et al. | 374/39 |
| 4,224,825 | 9/1980 | Feller | 374/41 |
| 4,245,501 | 1/1981 | Feller | 374/41 |
| 4,250,747 | 2/1981 | Diprose et al. | 364/510 |
| 4,388,003 | 6/1983 | Feller | 374/41 |
| 4,437,771 | 3/1984 | Cazzaniga | 374/39 |
| 4,459,041 | 7/1984 | Knauss et al. | 374/39 |

FOREIGN PATENT DOCUMENTS

1546507  5/1979  United Kingdom ................ 364/510

OTHER PUBLICATIONS

"New Resistance-to-Frequency Converter for Temperature Measurements in Calorimeters", by R. Friedl and P. Seyfreid, *IEEE Transactions on Instrumentation and Measurement*, vol. IM-24, No. 4, Dec. 1975, pp. 322-324.

*Primary Examiner*—Felix D. Gruber
*Attorney, Agent, or Firm*—Bernard, Rothwell & Brown

[57] ABSTRACT

In the direct measurement of thermal energy transferred in heating or air conditioning installations, the difference between voltages from outflow and return flow temperature sensors is integrated during a first timing period and then discharged during a second timing period with a constant current to operate a gate passing a number of pulses proportional to the voltage difference. The first and second timing periods are initiated by impulses from a volume flow sensor. During non-timing-period intervals a reference voltage capacitance is set by integrating circuit feedback.

In collection of data from a plurality of thermal energy transfer meters, inputs from the meters are scanned at rates greatly exceeding the pulse frequencies to increment or decrement the count in digital filter stages of corresponding pairs of counters depending upon whether sensed voltage levels are opposite or equal to the last accepted voltage level as recorded in a most significant stage of the digital filter.

11 Claims, 11 Drawing Figures

METHOD AND APPARATUS FOR THE DIRECT MEASUREMENT OF THERMAL ENERGY TRANSFERRED BY A FLUID MEDIUM

BACKGROUND OF THE INVENTION

The present invention relates to a method, an apparatus and an installation for the direct continuous measurement of thermal energy transferred by a fluid medium to an exchanger for the heating or cooling of rooms, and the collection, memorization and distance transmission of the principal parameters of the system and relative apparatuses controlling the operation of the equipment.

Apparatus for direct measurement of the thermal energy transferred by a fluid medium are known, but they present some problems relative to the stability of operation, associated with the reference current, causing inaccurate operation. In particular, U.S. Pat. No. 3,617,713 describes an apparatus measuring temperature differences and heat quantities in a fluid in motion by means of signals proportional to the difference of temperature between two points of the fluid conduit and to the volume of fluid measured by a volume meter. It does not, however, give the absolute certainty that in case of a nul difference of temperature that there will be no totalization of energy. Similarly, an article entitled "New Resistance to Frequency Converter for Temperature Measurements in Calorimeters" by R. Friedl and P. Seyfried, published in *IEEE Transactions on Instrumentation and Measurement*, Vol. IM-24, No. 4, p. 322-324, December 1975, describes a circuit for the measurement of the difference of temperature between input and output of heat exchangers by means of resistance thermometers. Two thermometric resistances are part of a resistance to frequency converter, the frequency being proportional to their difference of resistance value. Moreover, the frequency depends upon some resistors and an added condenser. This circuit had been implemented to be used in a simple and reliable calorimeter for household use. However, such a circuit did not provide for the case of complete cancellation of any possible thermal drift due to variation of voltage and ambient temperature.

SUMMARY OF THE INVENTION

In order to avoid the above mentioned disadvantages of prior art thermal energy measurement techniques, an apparatus and method for the direct measurement of thermal energy transferred by fluid medium in a heat exchanger includes an automatic reference voltage setting circuit connected to one input of an integrator circuit. The automatic reference voltage setting circuit includes a reference voltage capacitance which is charged by feedback from the output of the integrator circuit when one of the outflow and return fluid temperature sensors for the heat exchanger is connected to the other input of the integrator circuit to produce a zero charging condition for the integrator capacitance. A programmer in response to receipt of a pulse from a fluid flow sensor for the heat exchanger opens a switch in the reference voltage feedback circuit which generating first and second timing intervals. During the first timing interval, the voltage across the second of the outflow and return fluid temperature sensors is applied to the second input of the integrator circuit to thereby charge the integrating capacitance in accordance with the difference between the outflow and return fluid temperature sensors. During the second timing interval, the second input of the integrator circuit is controlled by a constant current to produce a constant discharging current for the integrating capacitance. A gating circuit is connected to the output of the integrator circuit and responds only while the voltage generated during the second interval exceeding a voltage corresponding to zero temperature difference between the outflow and return temperature sensors to pass a number of pulses from a clock or oscillator in proportion to the difference between the input and output temperatures. A counting circuit receiving the pulses from the gating circuit produces a reading of the energy transferred by the heat exchanger.

In another aspect of the invention, there is provided a memory including a plurality of counters for counting pulses generated by a respective plurality of thermal energy meters. The number of counters is twice the number of thermal energy meters and multiplexing means scans the incoming pulses at a sufficient rate to update the two counters for each energy meter at different times to avoid counting errors in at least one of the counters due to induced voltage spikes.

In accordance with still another aspect of the invention, memory means for accumulating pulses from energy meters measuring quantities of heat transfer includes counters wherein least significant digit portions form electronic filters which count up for respective scanned input voltage levels being opposite to the last accepted voltage levels and which count down for respective scanned input voltage levels being the same as the last accepted voltage levels. Multiplex scanning of input voltage levels is at a high enough rate to count out the digital filter portion during each pulse and each interval between pulses to thereby verify the true existence of pulses and intervals therebetween.

Therefore, compared with the known technique, the present invention offers many advantages. The problems relative to the stability of operation, associated with the reference current, have been solved by means of original electronic devices of limited cost. Specifically, there is the absolute certainty that in case of a difference of temperature equal to zero, there is no totalization of energy. Any possible thermal drift, due to variations of voltage and ambient temperature, is cancelled by means of a particular automatic zero set circuit. Thermal energy measurement is carried out very quickly for every signal coming from the volume sensor, and not continuously so as to avoid errors. High frequency automatic commutation of both current generators for the measurement of the temperatures operates so that eventual differences are cancelled. Automatic compensation of the connecting lines of the temperature sensors operates so that the measurement of the difference of temperature are not influenced by the length of the lines. Insensitiveness to internal sources of disturbance is obtained. The system has the flexibility to be connected to any volume sensor, generators of impulses of any type and with any relation between volume of flow and impulse. There is a complete possibility of collection of the totalization data, of its memorization, printing and remote transmission. There is also a possibility of easily verifying the operation of the system in its whole, also in the field.

BRIEF DESCRIPTION OF THE DRAWINGS

Further advantages will be evident and will be emphasized in the following pages. The preferred realization of the apparatus according to the present invention is described here by way of example and without limitation, with reference to the enclosed drawings, where.

DESCRIPTION OF THE PREFERRED EMBODIMENT

The definition of the physical magnitude of thermal energy in the field of application of the apparatus of the present invention, may be expressed as follows:

$$Q = \int_{t_2}^{t_1} m\, c_p(t)\, dt \quad (1)$$

where
Q = thermal energy in Kwh
$c_p$ = specific heat (maximum thermal capacity)
$t_1$ and $t_2$ = temperature of the fluid entering and leaving the exchanger in °C.
m = mass of the fluid in Kg.

For the continuous measurement of the mass m, it is necessary to measure the volume by means of the volume sensor. Thus, $m = \rho(t) V$ where $\rho(t)$ = density (weight per volume in Kg/m³), and V = condensed fluid volume in m³. Therefore, also $$Q = V \int_{t_2}^{t_1} \rho(t)\, c_p(t)\, dt \quad (2)$$

The value of this integral for water and various values of $t_1$ and $t_2$ was calculated and tabulated by the PTB of Berlin, publication 84 6/74 of Dr. H. Magdeburg, entitled "Table of the Thermal Flow Coefficient for Water, for the Control of Heat Meters". For $t_1$ and $t_2$ we have from (1)

$$Q = m(t_1 c_{p1} - t_2 c_{p2}) \quad (3)$$

$c_{p1}$ = mean thermal mass capacity $t_1$,
$c_{p2}$ = mean thermal mass capacity at $t_2$, from which for water: $Q = V \cdot (t_1 c_{p1} - t_2 c_{p2})$ being $$\rho = \frac{1}{v}$$

$$v = \text{mass volume in } \frac{m^3}{Kg}$$

Taking the coefficient K ($t_1, t_2$), we have $$Q = V \cdot (t_1 - t_2) \cdot K(t_1, t_2) \quad (4)$$

K = volumetric thermal coefficient in $Kwh \cdot m^{-3} \,°C.^{-1}$
In its turn, the temperature is measured by means of thermoresistances, for which $$t = R \cdot \chi(R) \quad (5)$$

where $\chi(R)$ is the non linear characteristic of the thermoresistance and R the resistive value for t of the thermoresistance itself. From equations (4) and (5) there is obtained $$Q = V \cdot [(R_1) \cdot \chi(R_1) - (R_2) \cdot \chi(R_2)] \cdot K(R_1, R_2)$$

from which introducing $$\chi^* = \frac{R_1 \chi(R_1) - R_2 \chi(R_2)}{R_1 - R_2}$$

we shall have $$Q = V \cdot (R_1 - R_2) \cdot \chi^*(R_1 R_2) \cdot K(R_1, R_2)$$

Figure 1:
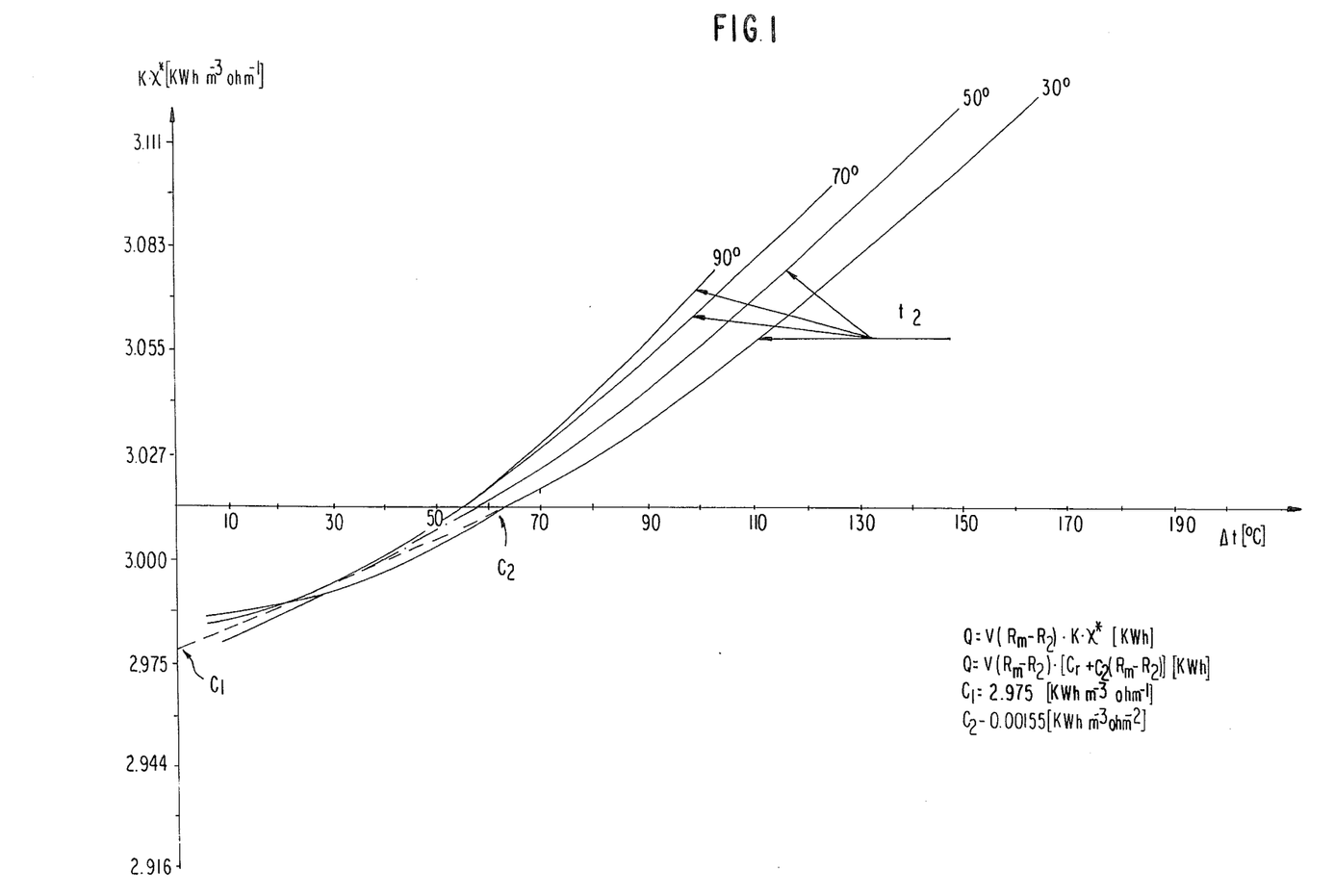
FIG. 1 is a diagram showing the curves of the volume thermal ratio for the thermoresistance characteristic as a function of the difference of temperature between the fluid entering and leaving the heat exchanger.

The tabulated experimental values of K demonstrate its dependency upon the temperatures $t_1$ and $t_2$ and then respectively upon $R_1$ and $R_2$ which, because of the platinum used for thermoresistance is simplified and becomes a simple linear dependency of the sole difference $(R_1 - R_2)$ and that is $$K(R_1, R_2) \cdot \chi^*(R_1, R_2) = [C_1 + C_2(R_1 - R_2)]$$

from which $$Q = V \cdot (R_1 - R_2) \cdot [c_1 + c_2(R_1 - R_2)] \quad (6)$$

where
$c_1 = 2.975$ Kwh $m^{-3}$ ohm$^{-1}$
$c_2 = 0.00155$ Kwh $m^{-3}$ ohm$^{-1}$ The expression (6) is, by approximation, a linear approximation of the thermal energy shown with a dotted line in FIG. 1 also showing the constants $c_1$ and $c_2$, the Volume V and the difference $R_1 - R_2$ of resistance between both outflow and return resistances. The expression (6) in a temperature range from 10° C. to 150° C. for the outflow temperature ($t_1$) and from 10° C. to 110° C. for that of the return flow ($t_2$) permits measurement of the thermal energy with a total error of 0.1% for values of $t_1 - t_2$ lower than 70° C. ($\Delta t$ of FIG. 1), much lower than the variation of the K coefficient in the aforesaid temperature range, which is of about 4%. In the electronic circuit which is described here, this linearization is obtained according to the dotted line, for which there is an effective compensation of the K coefficient as a function of $t_1$ and $t_2$ in the range of service temperatures of the heating plants for which the thermal energy meter of the present invention was studied.

Figure 2:
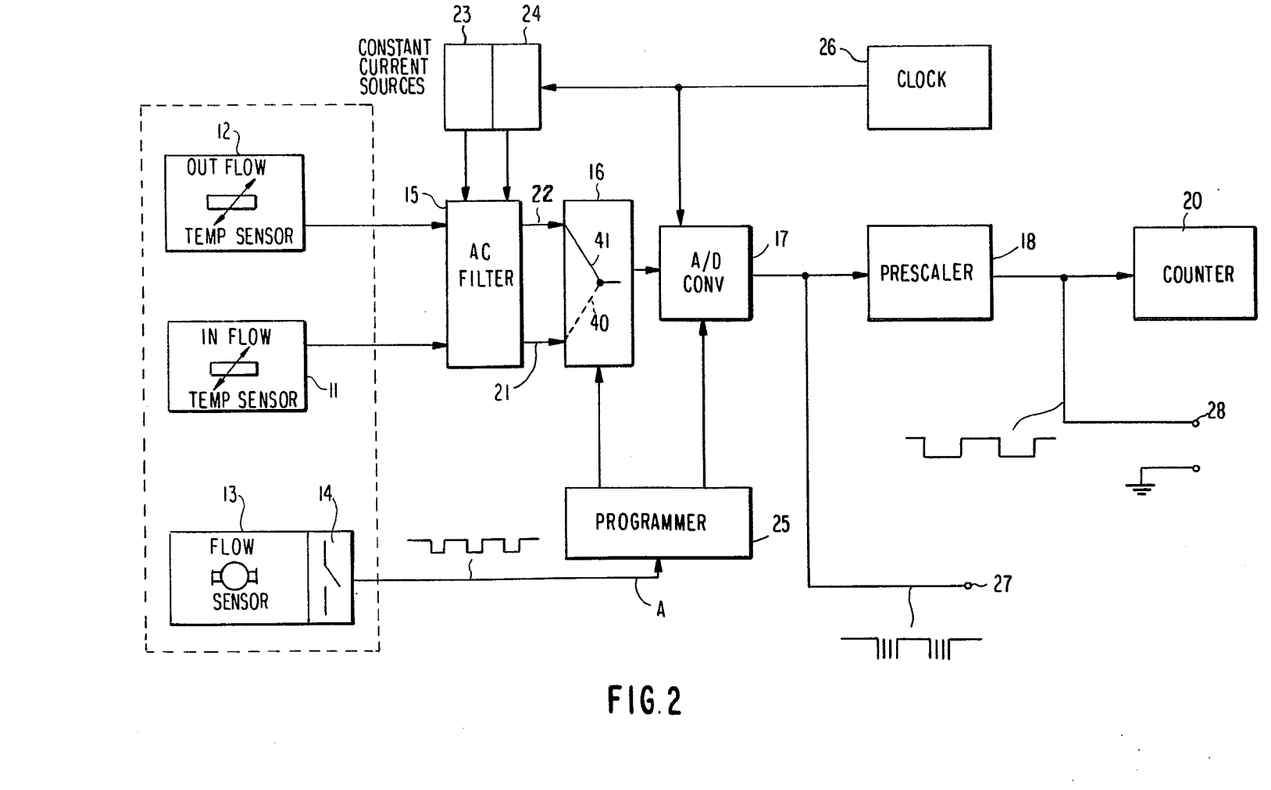
FIG. 2 is a block diagram showing the apparatus for measurement of the thermal energy according to the present invention.

Referring now to FIG. 2 of the drawings, the thermal energy meter gives a square wave pulse output wherein the number of pulses over a period of time is proportional to the thermal energy transferred in the heat exchanger during this period of time. These output pulses, which are counted by the electromagnetic counter 20, are generated in the following way. Each time the flow sensor 13 completes a number of revolutions corresponding to a predetermined volume of fluid flow through the heat exchanger, its impulse generator switches off and on to produce an impulse; thus the number of impulses from the flow sensor 13 over a period of time is proportional to the volume of fluid flow through the sensor during such time period. This impulse train (A) acts as a trigger input to the programmer 25 starting the analog-to-digital (A/D) converter 17. The temperature sensors of outflow 12 and return 11 are continuously energized by two constant closely matching current sources 23 and 24. The voltage signals coming from the temperature sensors 11 and 12 are proportional to their respective resistance values and correlated to the respective outflow and return temperatures of the fluid. These direct current signals are a.c. filtered in the input conditioner stage or filter 15 so as to suppress any possible disturbance of low and high frequency generated by possible electromagnetic fields in the vicinity of the sensors or their connections. The input of the A/D converter 17 is normally connected via switch 16 to the filtered output signal of the outflow sensor 12.

Figures 3, 4:
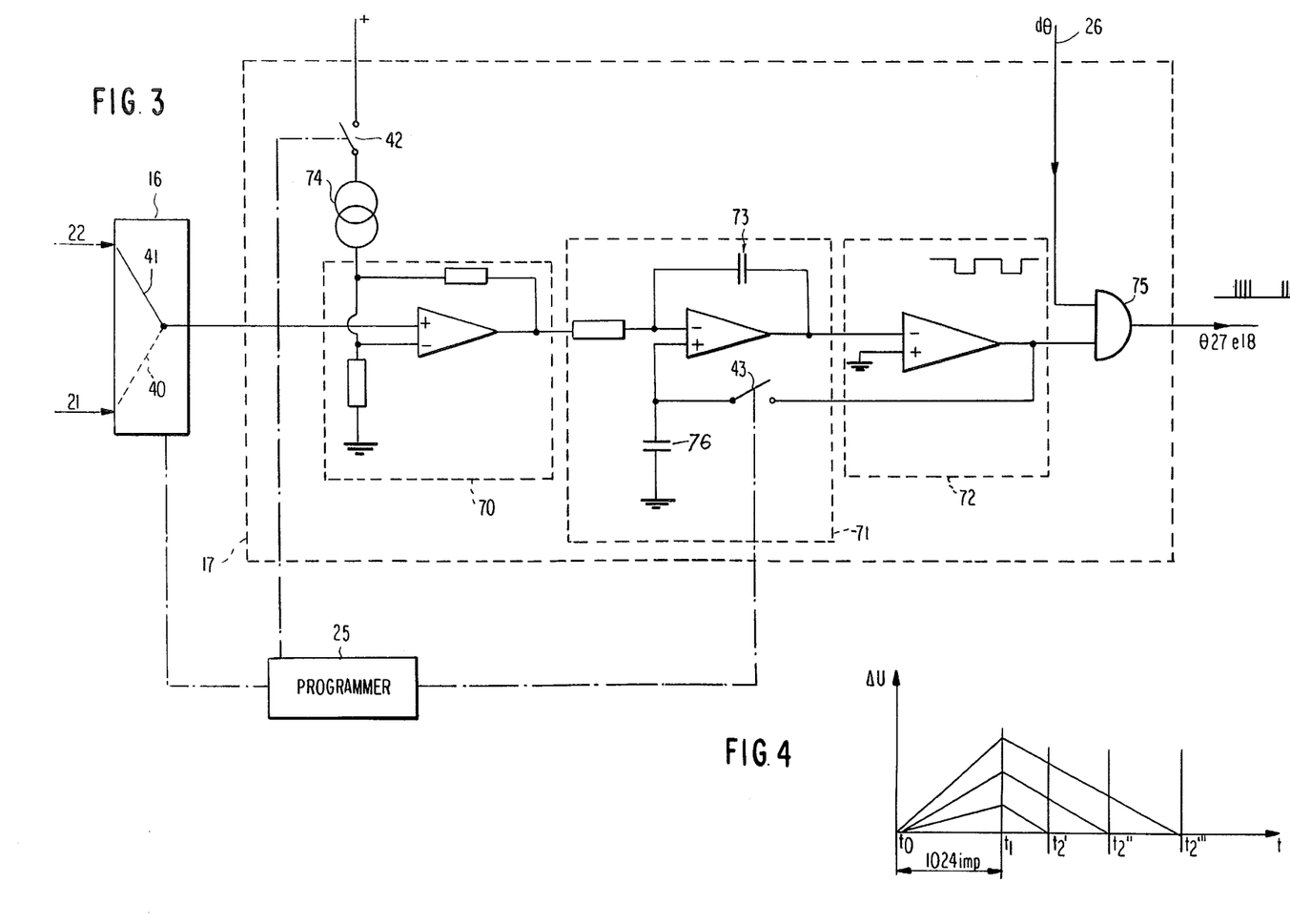
FIG. 3 is an electric diagram showing the analog-to-digital converter of the apparatus in FIG. 2.
FIG. 4 is a diagram showing the various curves of charge and discharge of the condenser of the integrating circuit of the converter in FIG. 3.

As shown in FIG. 3, an automatic zero circuit including capacitor 76 and switch 43, inside the A/D converter 17, forces the voltage at the reference input to integrator 71 to be the same as the A/D converter amplifier 70 output, so that the A/D converter integrator 71 input current returns to zero. This happens whenever the flow sensor does not send its impulse. When on the other hand a flow sensor trigger pulse occurs, the A/D converter input is switched by means of programmer 25 from voltage signal 22 to voltage signal 21 of the return sensor for a fixed time ($t_0$, $t_1$) corresponding to 1024 impulses of clock generator 26.

As shown in FIG. 4, the A/D converter amplifier 70 output voltage shifts by an amount proportional to the difference in voltage of the temperature sensors 21 and 22. During the 1024 clock pulse time, the condenser 73 of the integrator circuit 71 is charged with a voltage $\Delta U$ proportional to this difference, as shown in FIG. 4. In the following period, the condenser 73 is discharged for a variable time ($t_1$, $t_2$) to its equilibrium level determined by a constant current source 74. Discharge time to equilibrium value is proportional to the difference between the voltages 21 and 22 of the temperature sensors, as shown in FIG. 4.

To sum up, the programmer 25 closes contacts 40 and opens contacts 41 for the time ($t_0$, $t_1$), closes switch 42 for the time ($t_1$, $t_2$), and opens switch 43 for the time ($t_0$, $t_2$). The automatic zero circuit during the time that the switch 43 is closed between pulses from the flow sensor transducer 14, establishes a reference voltage across the capacitor 76 producing a zero charging current condition for integration capacitor 73 when the converter 17 input is equal to the voltage on line 22 across the sensor 12. Charging of the capcitor 73 occurs during time ($t_0$, $t_1$) only when the voltage on line 21 is higher than the voltage on line 22 indicating that energy is being transferred. During the discharge period ($t_1$, $t_2$), charge accumulated on the capacitor 73 results in the output of the comparitor 72 opening the AND gate 75 while the accumulated charge is discharged to enable the passage of a clock pulse train from generator 26 in a number proportional to the difference of voltage of the outflow and return temperature sensors.

These A/D converter output pulses go to the test connector as well as to the prescaler stage 18 which is a binary counter of fixed ratio which generates a square wave impulse each time a fixed number of pulses reaches its input. The prescaler 18 output is connected to the electro-mechanical counter 20 which permits direct reading of the totalized number of operations and therefore thermal energy transferred into the chosen unit. The prescaler 18 output is also connected to the data transmission line 28 for the data memorization substation described herein with reference to FIG. 7. The number of impulses reaching the counter 20 during a given period of time is given by the number of revolutions of the flow counter 13, which generates a trigger impulse to the transducer 14, multiplied by the difference in voltage of the temperature sensors, proportional in its turn to the difference of resistance of these sensors, and therefore multiplied by a constant calibration coefficient of the system. This is exactly corresponding to basic equation (1) previously specified.

The use of the same power supply voltage for both current generators 23 and 24 and the current of reference 74 in the A/D converter circuit compensates the eventual variations of this voltage with reference to the number of A/D converter output pulses, so that there is no need for a stable voltage, nor for a reference current in the system. The use of a single clock generator 26 in the determination of the charging time for condenser 73 of integrator 71 as well as in measuring the discharge time, compensates for the influence of the eventual variation of frequency that could affect the number of the A/D converter output pulses; therefore, a fixed reference frequency in the system is not necessary. The use of a dual current generator 23 and 24 to supply the temperature sensors 11 and 12 brings an excellent equality of relative currents and thus an accurate "zero" value of the apparatus, should both temperatures be identical, as will be explained below. Due to the "automatic zero circuit", the A/D converter output is unaffected by drift, gain, current and voltage variations in the A/D converter amplifier, integrator, and comparator stage 72. The sole components determining system accuracy are the resistors determining the levels of the sensors' current generators and the resistor determining the gain of the amplifier 70.

High precision components with low thermal drift are selected. A commonly used circuit for heat measurement is a circuit like that in FIG. 5 consisting of a bridge with four resistors, two of which are the temperature sensors $R_1$ and $R_2$ and the other two are passive resistors R and R' of identical value. Should the outflow and return temperatures be equal, the output voltage of the bridge should be $\Delta U = 0$, where $$\Delta U = U_b \cdot \frac{R_2 \cdot R' - R_1 \cdot R}{(R + R_2)(R' + R_1)}.$$

Figure 5:
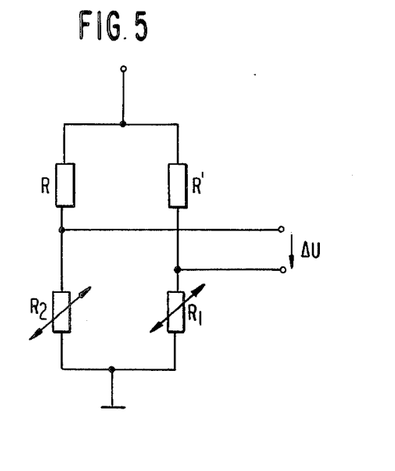
FIG. 5 is a schematic diagram showing a bridge circuit for heat measurement, according to the known technique.

With $$\gamma = \frac{R'}{R} \text{ and } \alpha = \frac{R_2}{R_1}$$

by replacing, we obtain:

$$\Delta U = U_b \frac{R_1}{(R + \alpha R_1)(\gamma R + R_1)} (\alpha\gamma - 1).$$

For $\alpha \simeq 1$, $\gamma \simeq 1$ we obtain:

$$\Delta U = U_b \frac{R_1}{(R + R_1)^2} (\alpha\gamma - 1). \tag{7}$$

The platinum sensors have a thermal drift of about 3860 ppm/°C. This means that an unbalanced bridge with a 0.1° C. asymmetry will show a ratio $\alpha = 1.000386$ between outflow and return sensors. As is shown in equation (7), the expression of $\Delta U$ (considering values of $\alpha$ and $\gamma$ equal to about one) contains interchangeable $\alpha$ and $\gamma$. This means that a difference in the passive resistances R' and R for which $\gamma = 1.000386$ produces an error of 0.1° C. temperature measurement. For an accurate energy measurement, for instance when the thermal jump is small (3° to 5° C.) and the temperatures low, a bridge error contribution of 0.1° C. is hardly tolerable, as the relative error of measurement is from 3.3 to 2%. On the other hand, a variation of only 0.04% in passive resistors, leading to a 3% error in temperature measurement, is hardly avoidable with the choice of the components or their stability in time. The absolute value of both resistors R and R' is not so important supposing they are identical. The influence of their absolute value on U is proportional to their very value. An absolute error of 0.04% between these resistors results in a 0.04% error of the measurement of the difference of temperature.

Figure 6:
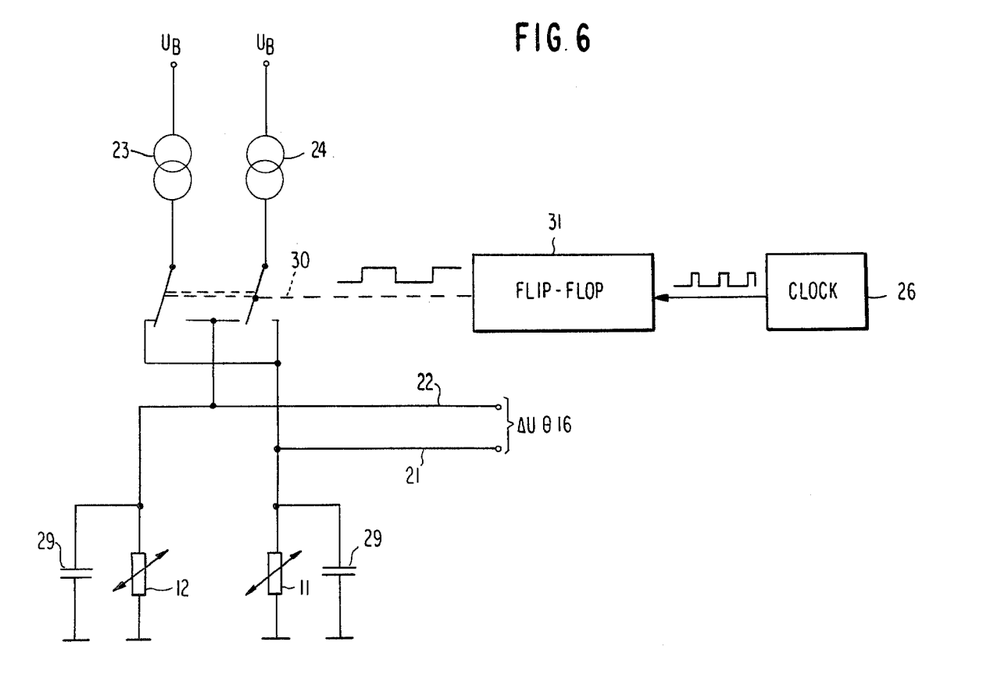
FIG. 6 is a block diagram showing a bridge for the measurement of the difference of temperature, in accordance with the present invention.

To overcome this difficulty, a bridge was designed to measure the difference of temperature, following a new scheme as shown in FIG. 6. Two practically identical generators of current 23 and 24 meant to supply the temperature sensors 11 and 12 are permutated by means of a dual switch 30. This switch is piloted by a signal the commutation time of which has an exact ratio of 1:1, easy to achieve by means of the output of a flip-flop binary counter 31. Eventual ripples due to the difference in the currents generated by the relative generators, are suppressed by means of the two condensers of filter 29. This way, the effective currents in sensors 11 and 12 are both identical to the arithmetic average of that in generators 23 and 24. The absolute value of the current of sensors 11 and 12 has the same accuracy and stability as both current generators 23 and 24. Tolerances of the order of 1% do not appreciably affect the measurement of the difference of temperature.

Figure 7:
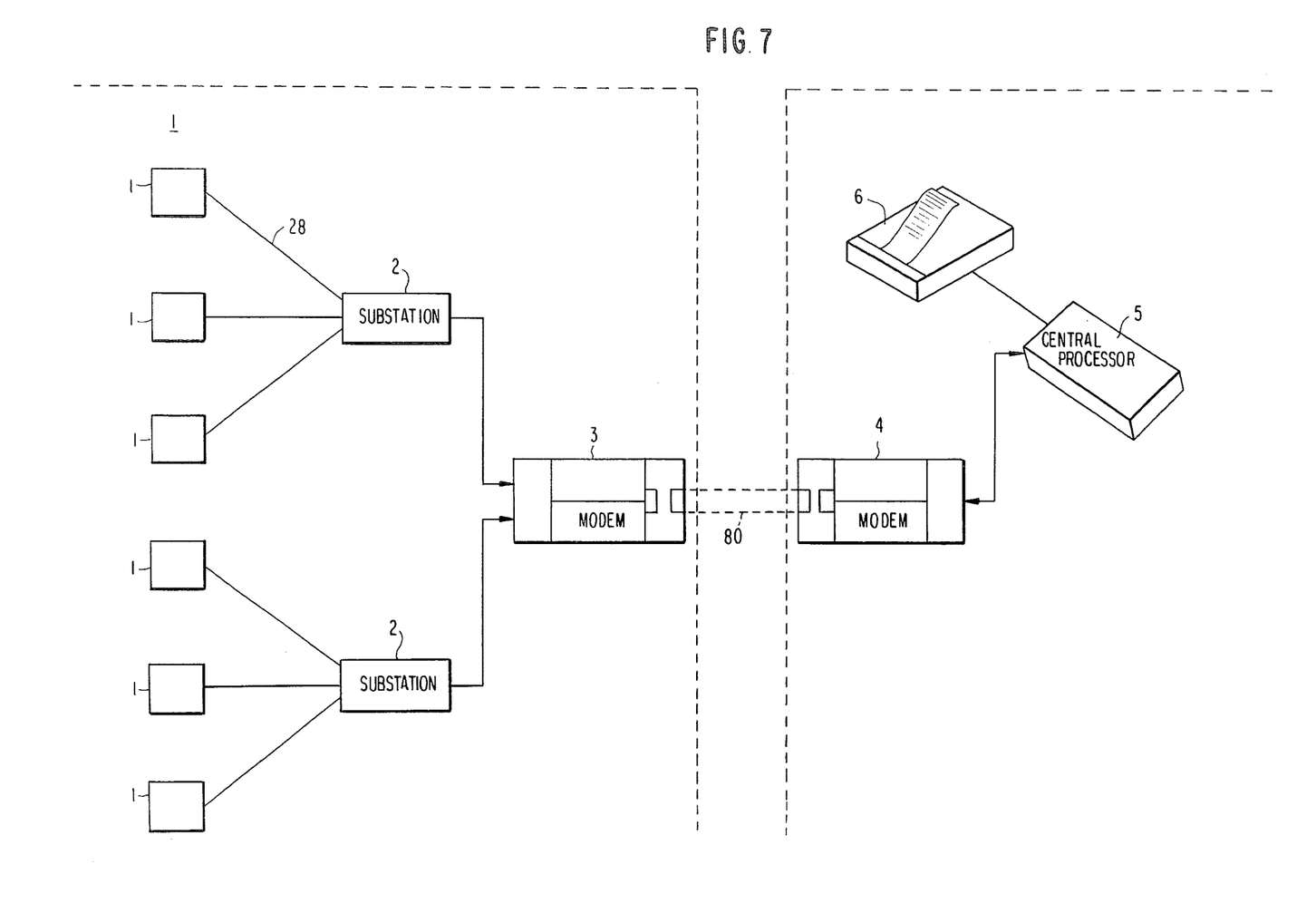
FIG. 7 is a block diagram showing a substation for data collection according to the present invention.

The substation 2, FIG. 7, collects the information on lines 28 from the counters 20 of thermal energy meters 1 and sends, in its turn, the collected information to the modem 3. Remote totalization is done in the substation which centralizes the data sent by the single thermal energy meters 1 connected to the substation by means of dual telephone wires 28. In the substation, totalization is carried out by means of a large capacity electronic memory for best adaptation and lower cost so as to be able to transmit this data via modem 3, telephone line 80 and modem 4 over a long distance to the central testing system 5.

Remote electronic totalization often has serious problems of data transmission breakdown between thermal energy meters 1 and substations 2 due to electromagnetic atmospheric disturbances or disturbances of other types along the connecting lines 28. A sufficiently large enough electric spike can disturb electronic counts simultaneously in all stages of an electronic counter, whereas an electric spike will, at the most, change a mechanical counter by one digit. To overcome this difficulty, the substations 2 read and count twice, in respective separate counters and at different times, the data supplied by each line 28. In this way, one of the readings of the counters in the substation will likely be correct. Furthermore, an electronic digital filter is provided in each substation between the substation input and each counter channel.

Figure 8:
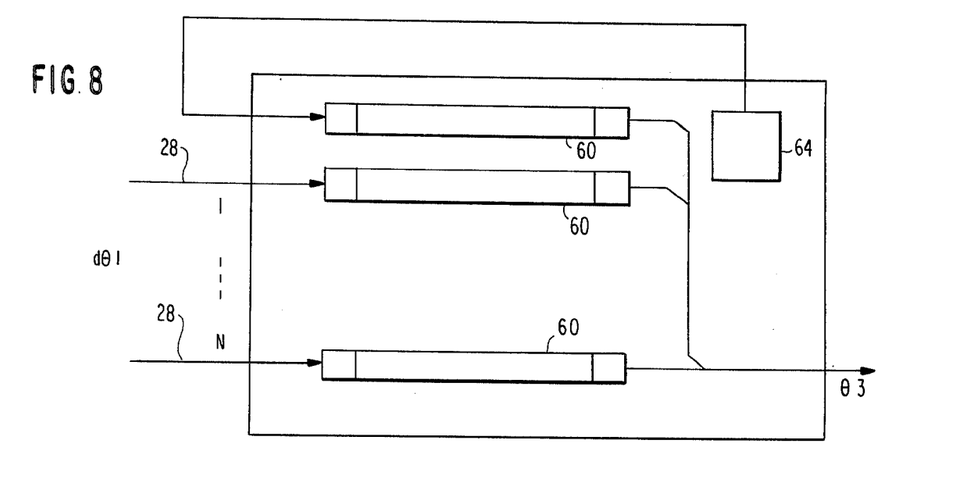
FIG. 8 is a block diagram showing the details of part of the substation in FIG. 7.

As shown in FIG. 8, the electronic memory of each substation contains a number of eight-digit BCD counters 60, the number of BCD counters being twice that of the number of connected meters (for instance, 128 BCD counters are provided if there are 64 connected meters). During readout of the memory to the central station 5, the counting function of the BCD counter should be neither disturbed nor interrupted. Also, the serial transmission of the memory data for each BCD counter over telephone line 80 (FIG. 7) requires an interval of time sufficient to transmit a complete eight digits of information. If an input pulse is added to a counter while its digits are being serially transmitted, the transmitted information can be erroneous. For example, if the count 00099999 is incremented by an impulse, it can be transmitted as 00090000 or 00100000 depending upon whether the impulse reaches the count between transmission of the fourth and fifth digits or prior to the fourth digit.

The central processor 5 of FIG. 7 checks the correspondence of the count in each pair of counters to determine the error condition.

Figure 9:
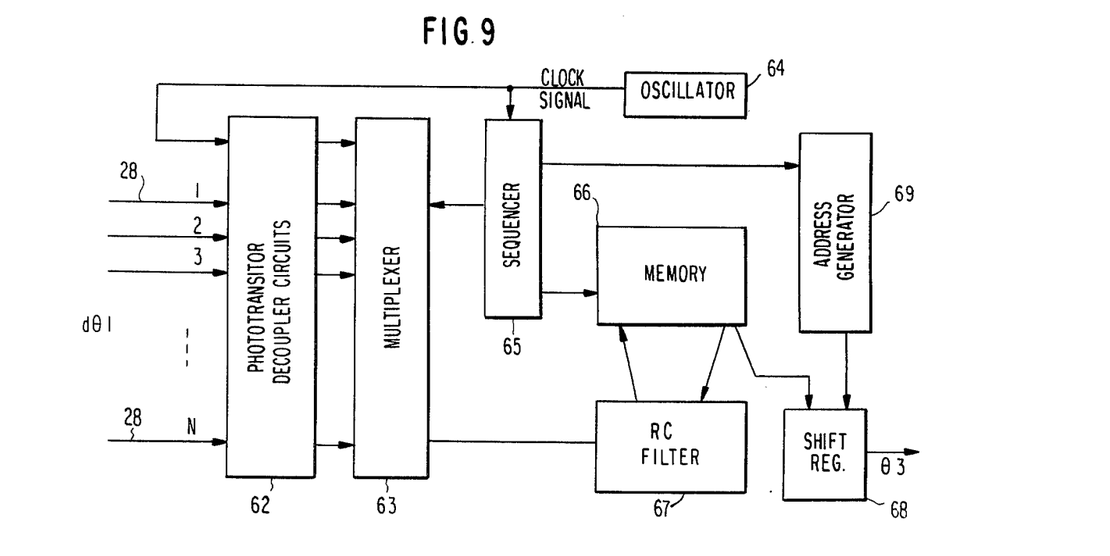
FIG. 9 is another detailed block diagram of part of the substation in FIG. 7.
Figure 10:
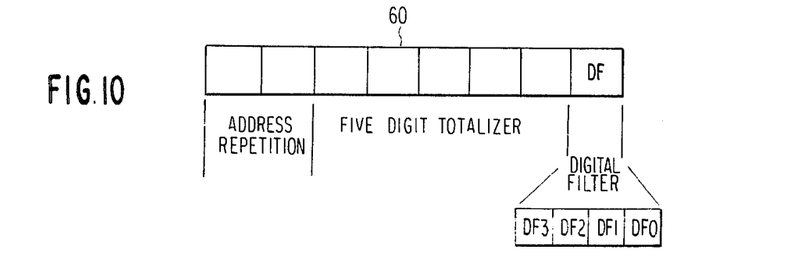
FIG. 10 is a diagram showing the organization of the eight digit information channel used in the substation in FIG. 7.

Each substation input is optically coupled by means of a phototransistor circuit 62 (FIG. 9) in order to reduce count errors due to electrical or electromagnetic disturbances generated in the vicinity of input lines. A large input multiplexer 63 followed by a small RC filter network 67 scans all inputs one by one with a scanning frequency controlled by sequencer 65. The multiplexer scanning frequency is several times higher than the highest input frequency of inputs 28. This means that each input is scanned at least twenty times during one period of the highest input frequency. Every time that scanning reaches a given position corresponding to the input of a specific thermal energy meter, the sequencer 65 addresses the corresponding memory location 66 containing an eight digit information 60. These eight digits may be addressed sequentially in order to simplify the use of the digit-wise, 4-bit organized, memory chips. Five of these eight digits 60 are used as a five digit counter or totalizer and will repeat the same information as given by the electromechnical counter of thermal energy. Whenever an impulse is sent on a given input line, the corresponding five digit counter is increased by one pulse. To do this, it is necessary to keep the last reading for this given input available in a special section of the memory. This is done in the lowest digit of the eight digit information channel 609 in the form of a digital filter (see FIG. 10).

So as to reduce the effect of induced spurious impulses to a minimum, the following digital filter was conceived. A high logical level input is only accepted as such after at least eight high level readings in the given channel without being interrupted by a signal of low logical level. Similarly, a low logical level input is only accepted after at least eight low level readings without having been interrupted by a signal of high logical level. The memory will only increase when this digitally filtered input shows a high to low level transition, separated for each channel counter 60. The digital filter operates as follows. When the multiplexer 63 reaches a given position, the subsystem carries out a reading-modification-registration operation digit by digit from right to left starting from DF. The level of the DF3 bit of the 4-bit digital filter is always kept identical to the last one received by the relative input 28 and is called filtered input. The three bits DF2 through DF0 make a count from 0 to 7 always counting the number of logical levels opposite the last accepted state. This means that when the last logical state accepted was of low level, every new signal of high logical state observed causes a count from DF2 to DF0 towards the highest count, while a new signal of low logical state causes a count towards the lowest count. Counts less than zero are not considered. When the count reaches seven and a high logical state is observed again, the DF3 bit commutes to one which means that the high logical state input is now accepted and the DF2 to DF0 counter is brought back to zero. Furthermore, a signal of high logical state observed again causes counting down and is therefore suppressed below zero. A signal detected again at the low logical state input causes counting upwards. When the DF count reaches seven again, DF3 commutes to zero with the next low logical level input signal detected. At the same time, a carry bit is generated which will increase the five digit totalizer by one unit during the following processing routine. Every time that the multiplexer 63 at the subsystem input has finished a complete scan through all inputs, the address generator 69 increases by one and addresses another complete information of the channel the eight digits of which are instantly transferred to the 32-bit serial shift register 68. From there it is output with slow synchronous baud rate (bit/sec) during the following multiplexer scan. Both left digits (address repetition) (FIG. 10) never change during processing. They are determined only once at the start for determination of the channel address, and transmitted and checked by the remote central system. Any variation of their contents gives an indication that a disturbance that may also influence registration of data was verified. The reading-modification-registration operation for the second eight-digit group for each thermal measuring unit 1 occurs after a delay equal to half the multiplexer scanning time from the reading-modification-registration operation of the corresponding first group. Therefore, the probability that disturbing sources such as anomalous impulses will result in the same error is quite negligible, and the main computer should in any case be able to verify this.

Modem interfaces and modems 3 and 4 are not described here (see FIG. 7). Modems are different according to the specifications in various countries. Anyway modem 3 must only accept a call from modem 4 and permit connection to one of the substations. This operation is carried out in parallel, each substation using a single line from the data transmission bus, which is eight bits in parallel. Modem 4 should provide for calls on a telephone line 80 of the requested modem 3 reporting to the relative substation. The central processor 5 collects all the readings given by thermal energy meters, gives an alarm signal when the data from some thermal energy meter does not logically compare with previous readings, processes the received data, prints out on printer 6 and carries out plotting for necessary statistics and consumption trends. To perform these processing operations, it sequentially closes connection via modem 4 and telephone line 80 with the various substations of the system. It must receive data strings from the substation and send them to its central memory. This transfer must be repeated a second time. It is now possible to process data, carry out tests and plausibility calculations for each individual connected thermal energy meter, and provide the following information:

broken line from the thermal energy meter,
if two successive readings from a same thermal energy meter are compatible,
if addresses are correct,
if the time reference of the specific substation channel shows a normal transfer compared to the previous one, and
if the new data logging is realistic compared with, for instance, that of the previous day.

When all the answers are definitely positive, the logged data is accepted. Otherwise, the central processor 5 outputs a signal for the specific input channel. Whenever the central processor 5 outputs an alarm for a specific thermal energy meter, a simple testing unit should be available for a first verification. The thermal energy meter is provided with a connection for a testing instrument. This instrument supplies the main parameters of operation; i.e., the difference of temperature between outflow and return, as registered by the relative temperature sensors, and the level of flow, which are processed by the relative meter. If the found data is not reliable, sensors and flow meter are disconnected and replaced by a test module permitting processing by the thermal energy meter of a specific output which can be verified by the central processor or a printer; as the connection line to the relative substation.

Figure 11:
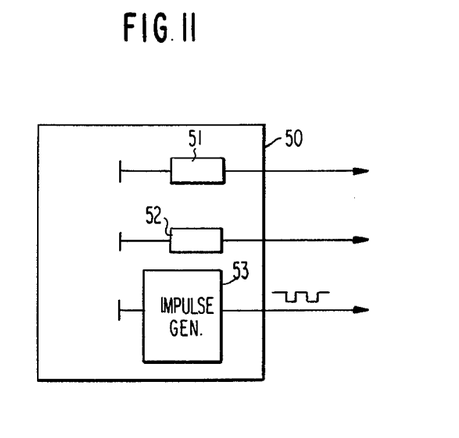
FIG. 11 is an electric circuit of the test module for the apparatus of FIG. 2.

The test module 50 shown in FIG. 11 will be inserted in the thermal energy meter in place of the temperature and volume sensors. It consists in two simulators 51 and 52 of temperature, of high stability and accuracy (outflow and return temperatures), a high precision impulse generator 53 simulating the volume sensor (flow meter). In this way, the thermal energy meter will process some known parameters and give the corresponding output, and the instrument will be easily verified. Obviously, numerous variations and modifications may be brought by technical experts to the above described realization of the present invention, without changing its spirit, and it is understood that any such variation and modification is considered part of the claimed invention.

I claim:

1. An apparatus for the direct measurement of thermal energy transferred in a heat exchanger by a fluid medium passing through fluid outflow tubing to the heat exchanger and passing through fluid return tubing from the heat exchanger, comprising:
an outflow temperature sensor for sensing the temperature of fluid in the outflow tubing;

a return temperature sensor for sensing the temperature of fluid in the return tubing;

a flow meter for sensing the volume of fluid flow through the heat exchanger and including an impulse generator for generating an electric impulse every time that a predetermined volume of fluid passes through the heat exchanger;

a programmer connected to the impulse generator and responsive to each electric impulse therefrom for generating first and second successive timing intervals;

first switch means operated by said programmer during the first timing interval;

said first switch means including an output, normally closed contact means for connecting one of the temperature sensors to the first switch means output when the first switch means is not operated, and normally open contact means for connecting the other temperature sensor to the first switch means output when the first switch means is operated;

a clock generator;

an analog-to-digital converter operated by the programmer and including (a) an operational amplifier integrator circuit with an integrating capacitance and a pair of inputs, (b) zero reference setting means having a reference voltage capacitance connected to one of the inputs of the operational amplifier integrator circuit and second switch means operated by the programmer during the absence of the first and second timing intervals for connecting an output of the operational amplifier integrator circuit to the one input of the operational amplifier integrator circuit to produce a reference voltage on the reference voltage capacitance, (c) means connecting the output of the first switch means to the other input of the operational amplifier integrator circuit to charge the integrating capacitance during the first timing interval in accordance with a difference between the temperature sensed by the outflow and return temperature sensors, (d) constant current means, (e) third switch means operated by the programmer for connecting the constant current means to the other input of the operational amplifier integrator circuit during the second timing interval to discharge the integrating capacitance at a constant rate, and (f) gate means enabled in response to the output of the operational amplifier integrator circuit during the second interval corresponding to the discharge time for the charge made on the integrating capacitance during the first timing interval to pass clock pulses from the clock generator; and counting means connected to the gate means for counting the number of pulses passed therethrough to indicate the quantity of energy transferred to the heat exchanger.

2. An apparatus according to claim 1 wherein the analog-to-digital converter includes an operational input amplifier having its non-reversing input connected to the output of the first switch means and its reversing input connected to the third switch means, said operational input amplifier having its output connected to the reversing input of the operational amplifier integrator circuit, and an operational comparator having its non-reversing input connected to ground and its reversing input connected to the output of the operational amplifier integrator circuit, said operational comparator having its output connected to the second switch means and to an input of the gate means.

3. An apparatus according to claim 1 further including two current generators for generating voltage across the outflow and return temperature sensors, dual alternating switch means for alternately connecting the two current generators to the outflow and return temperature sensors, and filter means for filtering switching frequency signals from voltages generated by the outflow and return temperature sensors.

4. An apparatus for the direct measurement of thermal energy transferred in a plurality of heat exchangers by a fluid medium passing through fluid outflow tubings to the heat exchangers and passing through fluid return tubings from the heat exchangers, comprising:

a plurality of thermal energy meters for the respective heat exchangers wherein each meter has an output on which is produced pulses having a frequency proportional both to the volume of flow of the fluid medium through the respective heat exchanger and to the difference between the temperature of the fluid in the respective outflow tubing and the temperature of the fluid in the respective return tubing;

multiplexer means for scanning voltage levels on the outputs from the thermal energy meters at a rate such that several complete scans are made over the duration of each pulse from the energy meters;

a memory including a plurality of counters which is twice the plurality of thermal energy meters wherein a respective pair of the counters correspond to each thermal meter;

sequencing means for sequentially addressing the plurality of counters in correspondence to the multiplexer means wherein each pair of counters corresponding to each thermal energy meter are addressed at different times in operation of the multiplexer means; and means responsive to the output of the multiplexer means for advancing the count in the corresponding addressed counter by one for each pulse generated on the corresponding output of the thermal energy meter.

5. An apparatus according to claim 4 wherein each counter in the memory includes (a) a plurality of pulse count stages for storing counts of the pulses from the respective energy meters; and (b) a plurality of level count stages forming digital filter means wherein a most significant level count stage indicates a last accepted logic level, lesser significant level count stages count up for each scanned voltage level opposite to the last accepted logic level and count down for each scanned logic level equal to the last accepted logic level, and the pulse count in the pulse count stages is incremented in response to a selected change in the most significant level count stage.

6. An apparatus according to claim 4 wherein each thermal energy meter includes:

an outflow temperature sensor for sensing the temperature of fluid in the outflow tubing;

a return temperature sensor for sensing the temperature of fluid in the return tubing;

a flow meter for sensing the volume of fluid flow through the heat exchanger and including an impulse generator for generating an electrical impulse every time that a predetermined volume of fluid is passed through the heat exchanger;

a programmer connected to the impulse generator and responsive to each electrical impulse therefrom for generating first and second successive timing intervals;

first switch means operated by said programmer during the first timing interval;

said first switch means including an output, normally closed contact means for connecting one of the temperature sensors to the first switch means output when the first switch means is not operated, and normally open contact means for connecting the other temperature sensor to the first switch means output when the first switch means is operated;

a clock generator; and an analog-to-digital converter connected to the output of the first switch means and operated by the programmer, said analog to digital converter including (a) an operational amplifier integrator circuit with an integrating capacitance and a pair of inputs, (b) zero reference setting means including a reference voltage capacitance connected to one of the inputs of the operational amplifier integrated circuit and second switch means operated by the programmer during the absence of the first and second timing intervals for connecting an output of the operational amplifier integrator circuit to the one input of the operational amplifier integrator circuit to produce a reference voltage on the reference voltage capacitance corresponding to zero charging current for the operational amplifier integrating capacitance, (c) means connecting the output of the first switch means to the other input of the operational amplifier integrator circuit to charge the integrating capacitance during the first timing interval in proportion to a difference between the outflow and return temperature sensors, (d) constant current producing means, (e) third switch means operated by the programmer for connecting the constant current producing means to the other input of the operational amplifier integrator circuit during the second timing interval to discharge the integrating capacitance at a constant rate, and (f) gate means enabled in response to the output of the operational amplifier integrator circuit during the second interval while the charge made on the integrating capacitance during the first timing interval is discharged to pass pulses from the clock generator.

7. An apparatus for the direct measurement of thermal energy transferred in a plurality of heat exchangers by a fluid medium passing through fluid outflow tubings to the heat exchangers and passing through fluid return tubings from the heat exchangers, comprising:

a plurality of thermal energy meters each having an output on which are produced pulses having a frequency which is a function of both the flow of fluid through the heat exchanger and to a difference in temperature between the fluid in the respective outflow tubing and return tubing;

multiplexer means for scanning voltage levels on the outputs from the thermal energy meters at a rate such that several complete scans are made over the duration of each pulse from the energy meters;

a memory comprising a plurality of counters each having a plurality of pulse count stages for storing counts of the pulses from the respective energy meters;

sequencing means for sequentially addressing the plurality of counters in correspondence with the multiplexer means; and each counter of the plurality of counters including a plurality of level count stages forming digital filter means wherein a most significant level count stage indicates a last accepted logic level, lesser significant level count stages count up for each scanned voltage level opposite to the last accepted logic level and count down for each scanned voltage level equal to the last accepted logic level, and the pulse count in the pulse count stages is incremented in response to a selected change in the most significant level count stage.

8. An apparatus according to claim 7 wherein each thermal energy meter includes:

an outflow temperature sensor for sensing the temperature of fluid in the outflow tubing;

a return temperature sensor for sensing the temperature of fluid in the return tubing;

a flow meter for sensing the volume of fluid flow through the exchanger and including an impulse generator for generating an electric impulse every time that a predetermined volume of fluid is passed through the exchanger;

a programmer connected to the impulse generator and responsive to each electric impulse therefrom for generating first and second successive timing intervals;

first switch means operated by said programmer during the first timing interval;

said first switch means including an output, normally closed contact means connecting one of the temperature sensors to the output of the first switch means, and normally open contact means connecting the other temperature sensor to the output of the first switch means;

a clock generator; and an analog to digital converter connected to the output of the first switch means and operated by the programmer;

said analog to digital converter including an operational amplifier integrator circuit with an integrating capacitance and a pair of inputs, zero reference setting means including a reference voltage capacitance connected to one of the inputs of the integrator circuit and means with second switch means operated by the programmer during the absence of the first and second timing intervals for connecting an output of the integrator circuit to the one input of the integrator circuit to produce a reference voltage on the reference voltage capacitance, means connecting the output of the first switch means to the other of the inputs of the integrator circuit to charge the integrating capacitance during the first timing interval in accordance with the difference between the temperatures sensed by the outflow and return temperature sensors, a constant current producing means, third switch means operated by the programmer for connecting the constant current source to the other input of the integrator circuit during the second timing interval to discharge the integrating capacitance at a constant rate, and gate means enabled in response to the output of the operational amplifier integrator circuit during the second timing interval while the charge produced on the integrating capacitance during the first timing interval is discharged to pass pulses from the clock generator.

9. A method for the direct measurement of thermal energy transferred in a heat exchanger by a fluid medium passing through fluid outflow tubing to the heat exchanger and passing through fluid return tubing from the heat exchanger, comprising the steps of:

generating an outflow temperature voltage indicative of the fluid temperature in the outflow tubing;

generating a return temperature voltage indicative of the fluid temperature in the return tubing;

generating flow impulses having a frequency proportional to the volume of flow of fluid through the heat exchanger;

operating a timing programmer in response to each flow impulse to generate first and second successive timing intervals;

operating first switch means during the first timing interval for disconnecting one of the outflow and return flow temperature voltages from one input of an integrator circuit and for applying the other of the outflow and return temperature voltages to the one input of the integrator circuit;

charging an integrating capacitance in the integrating circuit in correspondence to the difference between the other temperature voltage and a reference capacitance voltage applied to the other input of the integrator circuit during the first timing interval;

applying a voltage corresponding to a constant current source to the one input of the integrator circuit during the second timing interval to discharge the integrating capacitance at a constant rate;

enabling a gate during the second timing interval for the duration that the output voltage of the integrator circuit corresponds to a charge deposited upon the integrating capacitance during the first timing interval to enable the gate to pass pulses;

generating clock pulses;

passing the clock pulses through the enabled gate means; and operating feedback switch means for applying output voltages from the output of the integrator circuit to the reference voltage capacitance during the absence of the first and second timing intervals to thereby establish the reference voltage thereon.

10. A method for the direct measurement of thermal energy transferred in a plurality of heat exchangers by a fluid medium passing through outflow tubings to the heat exchangers and passing through return tubings from the heat exchangers, comprising the steps of:

scanning by multiplexer means the voltage levels on a plurality of outputs of energy transfer meters producing pulses corresponding to energy transferred by a plurality of heat exchangers at a rate such that several complete scans are made over the duration of each pulse;

sequentially addressing a plurality of counters in correspondence to the scanning of the outputs of the plurality of energy transfer meters;

counting up the count in lesser significant stages of a filter digit in each addressed counter when the scanned voltage level is opposite to the last accepted logic level indicated in a most significant stage of the filter digit;

counting down the count in the lesser significant stages of the filter digit of each addressed counter when the scanned voltage level is equal to the last accepted logic level in the most significant stage of the filter digit;

changing the most significant stage in the filter digit of each addressed counter when the count in the lesser stages of the filter digit revert to zero during countup; and incrementing the count in a plurality of pulse count stages in each addressed counter when the most significant stage of the corresponding filter digit undergoes a selected change.

11. A method according to claim 10 wherein the sequential addressing includes addressing a pair of the plurality of counters corresponding to each of the outputs of the plurality of energy transfer meters at different times in each scan.

* * * * *

UNITED STATES PATENT AND TRADEMARK OFFICE
CERTIFICATE OF CORRECTION

PATENT NO. : 4,485,449

DATED : November 27, 1984

INVENTOR(S) : UWE KNAUSS

It is certified that error appears in the above-identified patent and that said Letters Patent is hereby corrected as shown below:

Column 1, line 62, delete "which" and substitute therefor --while--;

Column 6, line 2, delete "capcitor" and substitute therefor --capacitor--.

Signed and Sealed this

Fifteenth Day of October 1985

[SEAL]

Attest:

Attesting Officer

DONALD J. QUIGG

Commissioner of Patents and Trademarks—Designate